(12) United States Patent
Halaharivi et al.

(10) Patent No.: US 12,327,047 B2
(45) Date of Patent: Jun. 10, 2025

(54) MANAGING COMMAND COMPLETION NOTIFICATION PACING IN A MEMORY SUB-SYSTEM

(71) Applicant: Micron Technology, Inc., Boise, ID (US)

(72) Inventors: Raja V. S. Halaharivi, Gilroy, CA (US); Prateek Sharma, San Jose, CA (US); Venkat R. Gaddam, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 255 days.

(21) Appl. No.: 17/900,122

(22) Filed: Aug. 31, 2022

(65) Prior Publication Data

US 2024/0069807 A1    Feb. 29, 2024

(51) Int. Cl.
*G06F 3/06* (2006.01)

(52) U.S. Cl.
CPC .......... *G06F 3/0659* (2013.01); *G06F 3/0604* (2013.01); *G06F 3/061* (2013.01); *G06F 3/0679* (2013.01); *G06F 3/0674* (2013.01)

(58) Field of Classification Search
CPC .... G06F 3/0659; G06F 3/0604; G06F 3/0679; G06F 3/061
See application file for complete search history.

(56) References Cited

U.S. PATENT DOCUMENTS

| | | | | |
|---|---|---|---|---|
| 10,558,537 B1* | 2/2020 | Colgrove | ............ | G06F 11/1471 |
| 10,645,164 B1* | 5/2020 | Malwankar | ............ | G06F 3/0653 |
| 11,275,509 B1* | 3/2022 | Colgrove | ............ | G06F 11/1076 |
| 11,418,591 B1* | 8/2022 | Dhuse | ............ | G06F 11/1402 |
| 2006/0005074 A1* | 1/2006 | Yanai | ............ | G06F 11/2066 714/6.32 |
| 2012/0066435 A1* | 3/2012 | Colgrove | ............ | G06F 3/0688 711/E12.001 |
| 2012/0066447 A1* | 3/2012 | Colgrove | ............ | G06F 3/0634 711/E12.001 |
| 2012/0066448 A1* | 3/2012 | Colgrove | ............ | G06F 3/0689 711/E12.001 |

(Continued)

OTHER PUBLICATIONS

Mark Michon, "The Importance of Request Timeouts", Nov. 30, 2020, pp. 1-7, https://dev.to/bearer/the-importance-of-request-timeouts-l3n (Year: 2020).*

*Primary Examiner* — Christopher D Birkhimer
(74) *Attorney, Agent, or Firm* — LOWENSTEIN SANDLER LLP (57) ABSTRACT

A system includes a memory device and a processing device, operatively coupled with the memory device, to perform operations including: receiving, from a host system, a memory access command; executing the memory access command; identifying a characteristic associated with the memory access command; identifying a threshold period of time corresponding to the characteristic associated with the memory access command; determining that a period of time associated with the memory access command satisfies the threshold period of time; and responsive to determining that the period of time associated with the memory access command satisfies the threshold period of time, notifying the host system of completion of execution of the memory access command.

17 Claims, 5 Drawing Sheets

(56) References Cited

U.S. PATENT DOCUMENTS

| | | | |
|---|---|---|---|
| 2012/0066449 A1* | 3/2012 | Colgrove | G06F 11/0751 |
| | | | 711/E12.001 |
| 2014/0058717 A1* | 2/2014 | Fukumoto | G06F 12/0866 |
| | | | 703/21 |
| 2014/0068197 A1* | 3/2014 | Joshi | G06F 12/0866 |
| | | | 711/135 |
| 2014/0089259 A1* | 3/2014 | Cheng | G06F 16/27 |
| | | | 707/612 |
| 2015/0006830 A1* | 1/2015 | Shin | G06F 3/0683 |
| | | | 711/154 |
| 2016/0070491 A1* | 3/2016 | Takada | G06F 11/2082 |
| | | | 711/114 |
| 2018/0067695 A1* | 3/2018 | Sato | G06F 3/0613 |
| 2019/0129787 A1* | 5/2019 | Liu | G06F 11/0757 |
| 2021/0173588 A1* | 6/2021 | Kannan | G06F 3/061 |
| 2021/0318813 A1* | 10/2021 | Roy | G06F 21/6209 |
| 2021/0376854 A1* | 12/2021 | Zamir | H03M 13/1105 |
| 2022/0050777 A1* | 2/2022 | Sheperek | G01R 19/16538 |

* cited by examiner

MANAGING COMMAND COMPLETION NOTIFICATION PACING IN A MEMORY SUB-SYSTEM

TECHNICAL FIELD

Embodiments of the disclosure relate generally to memory sub-systems, and more specifically, relate to managing command completion notification pacing in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to managing command completion notification pacing in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

Memory access operations can be performed by the memory sub-system. The memory access operations can be host-initiated operations. For example, the host system can initiate a memory access operation (e.g., write, read, erase, etc.) on a memory sub-system. The host system can send memory access commands (e.g., write command, read command) to the memory sub-system, such as to store data at the memory device of the memory sub-system and/or to read data from the memory device of the memory sub-system.

When an application or operating system of the host system needs to access data (e.g., read data, write data), the host system can send a memory access command to the memory device directed to a logical address space. The logical address space can identify a logical unit, such as a logical block (e.g., the smallest write/read unit). In certain memory sub-systems, the host system can provide logical address information (e.g., logical block address (LBA), namespace) identifying the location where the data is to be stored at or read from. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), and the like. For simplicity, where "data" is referred to hereinafter, such data can be understood to refer to at least host data, but can also refer to other data such as system data.

In certain memory sub-systems, sending the memory access command to the memory sub-system can include the host system storing the memory access command in an entry of a data structure (e.g., a table) dedicated to storing memory access commands (also hereinafter referred to as a "submission queue"). The submission queue can be accessible to the memory sub-system. For example, a memory sub-system controller of the memory sub-system can fetch (e.g., retrieve) the memory access command from the entry of the submission queue and perform (e.g., execute) the operation specified by the memory access command (e.g., read data, write data). When the memory access command has been executed, the memory sub-system controller can notify the host system of completion of execution of the memory access command. In certain memory sub-systems, notifying the host system of completion of execution can include updating an entry of another data structure (e.g., another table) dedicated to storing notifications to the host system of completions of executions of memory access commands (also hereinafter referred to as a "completion queue"). Depending on the configuration setting of the memory sub-system, the host system can also be interrupted each time an entry of the completion queue is updated and/or at random times. This, however, impacts the performance of the host system and the memory sub-system because the host system may be busy when it needs to pause its current operations in order to process the interrupt. In certain memory sub-systems, the host system can enable another configuration setting, where the host system does not receive interrupts each time an entry of the completion queue is updated. Instead, the host system can choose to process interrupts and updates to entries of the completion queue at its own pace, thus resulting in less interrupts to the host system. However, this can also lead to inefficiency and impact the performance of the host system and the memory sub-system because the host system can waste resources and cycles when reading the entries of the completion queue without first knowing whether there has been any updates to the entries. If there has been no update, the host system has wasted bandwidth that it could have used to perform/process other operations that are more useful to the memory sub-system.

Aspects of the present disclosure address the above and other deficiencies by managing command completion notification pacing in a memory sub-system. Implementing the managing of command completion notification pacing in a memory sub-system can be used to control the pacing of memory access command completion notifications to the host system, thus avoiding interrupting the host system when the host system is busy. Instead of interrupting the host system each time an entry of the completion queue is updated with a notification of completion or interrupting the host system at random times when the host system could be busy, the host system can instead be interrupted only after a particular threshold period of time has been satisfied. For example, a memory sub-system controller can execute a memory access command. The memory sub-system controller can send a notification of completion to the host system (e.g., update an entry in the completion queue and/or interrupt the host system) when a particular period of time (e.g., a time from when the most recent notification of completion was sent to the host system to when memory access command was executed) satisfies a threshold period of time. The threshold period of time can differ depending on certain criteria and/or characteristics of the memory access command. For example, there can be a particular threshold period of time for memory access commands that are write commands, another threshold period of time for memory access commands that are read commands, another threshold period of time for memory access commands that are directed to a particular physical or virtual function with a corresponding set of quality of service (QoS) parameters, etc. Each threshold period of time can be preconfigured to meet certain device requirements and can be preconfigured in order to allow for a balance between the host system processing completed memory access commands from the completion queue and sending new memory access commands to the submission queue, thus improving overall memory sub-system performance.

To implement managing command completion notification pacing in a memory sub-system as described herein, a memory sub-system controller can receive a memory access command (e.g., write command and/or read command) from a host system. The memory sub-system controller can include a hardware component and a firmware component. The memory sub-system controller can execute the memory access command (e.g., using the firmware and/or hardware component of the memory device). In response to executing the memory access command, the memory sub-system controller can identify a certain characteristic of the memory access command, such as a command type of the memory access command (e.g., write command or read command) or one or more QoS parameters associated with the memory access command. Each characteristic can have a corresponding threshold period of time. The memory sub-system controller can identify the corresponding threshold period of time for the identified characteristic. For example, the memory sub-system controller can identify the corresponding threshold period of time for a write command or the memory sub-system controller can identify the corresponding threshold period of time for a read command. The memory sub-system controller can measure a period of time from when the most recent notification of completion of a previous execution of a memory access command was sent to the host system to the execution of the current memory access command. If the measured period of time is equal to or greater than the threshold period of time, then the memory sub-system controller can notify the host system of completion of the execution of the memory access command. If the measured period of time is less than the threshold period of time, then the memory sub-system controller waits to send the notification to the host system. Further details regarding implementing managing command completion notification pacing in a memory sub-system are described herein below with reference to FIGS. 2-4.

Advantages of the present disclosure include, but are not limited to, improved memory sub-system performance, less wasted resources by the host system, and control of the pacing of completion notifications. Instead of interrupting the host system each time an entry of the completion queue is updated with a notification of completion or interrupting the host system at random times when the host system could be busy, the host system can instead be interrupted only after a particular threshold period of time has been satisfied. The particular threshold period of time can be preconfigured to meet certain device requirements and can be preconfigured in order to allow for a balance between the host system processing completed memory access commands from the completion queue and sending new memory access commands to the submission queue, thus improving overall memory sub-system performance. Furthermore, the quality of service of the memory sub-system can be improved by reducing burstiness in completions and burstiness in overall memory sub-system.

Figure 1:
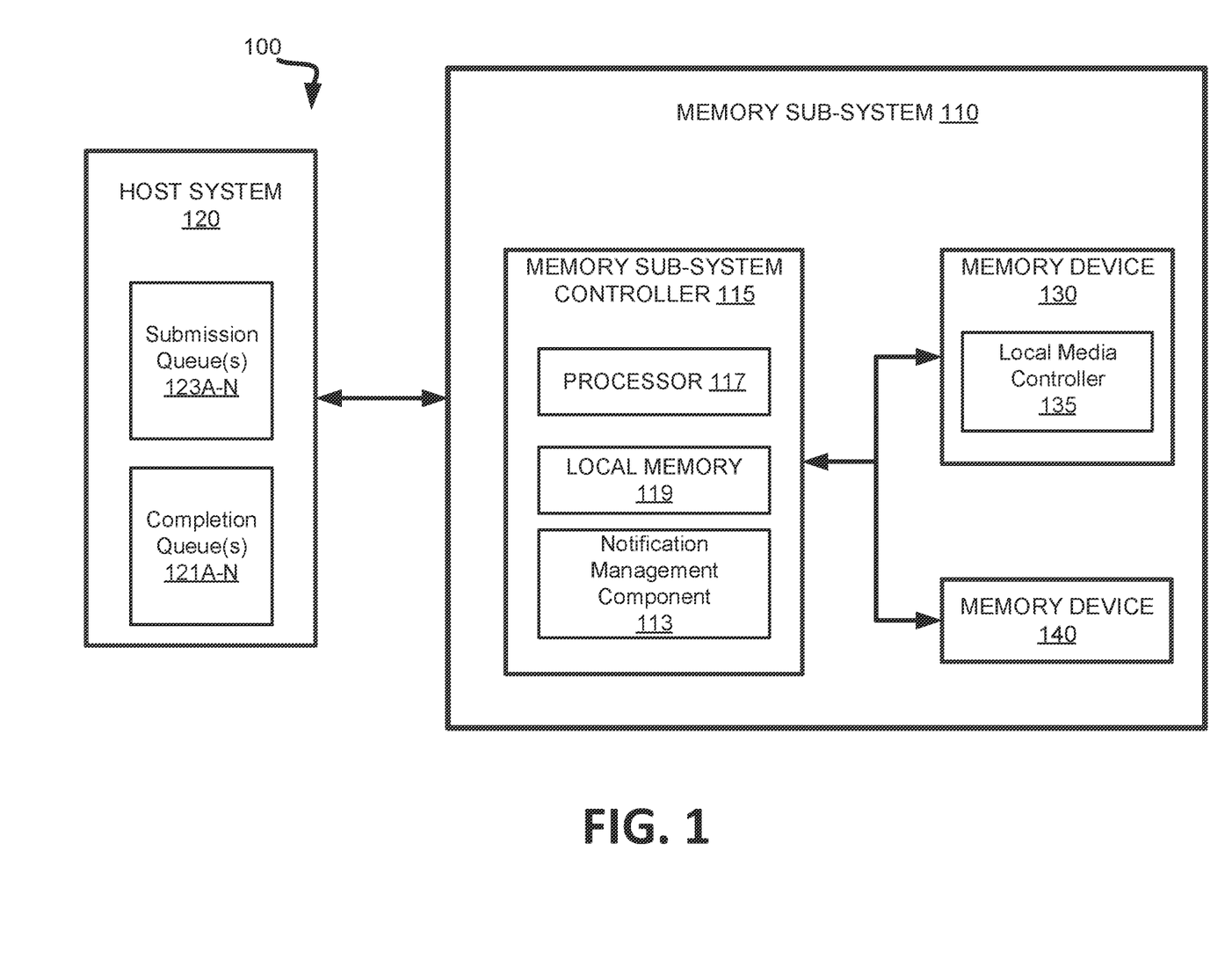
FIG. 1 illustrates an example computing system that includes a memory sub-system, in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110. The host system 120 can include one or more submission queues 123A to 123N. Each submission queue 123A to 123N can be a data structure (e.g., a table) with one or more entries, where each entry stores a memory access command. The host system can include one or more completion queues 121A to 121N. Each completion queue 121A to 121N can be a data structure (e.g., a table) with one or more entries, where each entry stores a notification of a completion of execution of a memory access command. The one or more submission queues 123A to 123N and/or the one or more completion queues 121A to 121N can be coupled to and/or otherwise accessible to the host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a notification management component 113 that can be used to implement managing command completion notification pacing in a memory sub-system, in accordance with embodiments of the present disclosure. In some embodiments, the memory sub-system controller 115 includes at least a portion of the notification management component 113. In some embodiments, the notification management component 113 is part of the host system 110, an application, or an operating system. In other embodiments, local media controller 135 includes at least a portion of notification management component 113 and is configured to perform the functionality described herein.

In some embodiments, the notification management component 113 can receive a memory access command (e.g., write command and/or read command) from a host system. The notification management component 113 can include a hardware component and a firmware component. The notification management component 113 can execute the memory access command (e.g., using the firmware and/or hardware component of the memory device). In response to executing the memory access command, the notification management component 113 can identify a certain characteristic of the memory access command, such as a command type of the memory access command (e.g., write command or read command) or one or more quality of service (QoS) parameters associated with the memory access command. Each characteristic can have a corresponding threshold period of time. The notification management component 113 can identify the corresponding threshold period of time for the identified characteristic. For example, the notification management component 113 can identify the corresponding threshold period of time for a write command, and/or the notification management component 113 can identify the corresponding threshold period of time for a read command. The notification management component 113 can measure a period of time from when the most recent notification of completion of a previous execution of a memory access command was sent to the host system to the execution of the current memory access command. If the measured period of time is equal to or greater than the threshold period of time, then the notification management component 113 can notify the host system of completion of the execution of the memory access command. If the measured period of time is less than the threshold period of time, then the notification management component 113 waits to send the notification to the host system.

Further details regarding implementing managing command completion notification pacing in a memory sub-system are described herein below with reference to FIGS. 2-4.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Figure 2:
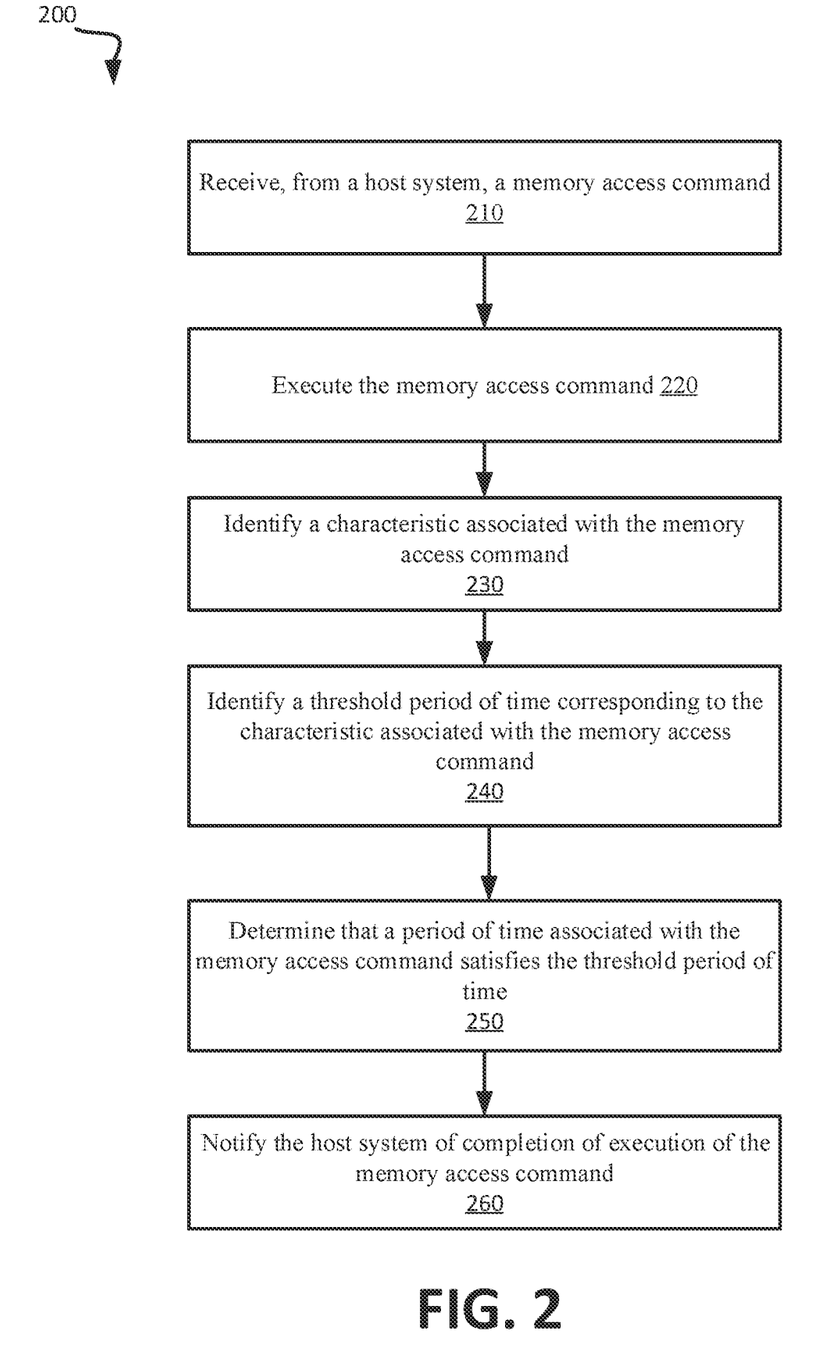
FIG. 2 is a flow diagram illustrating an example of a method to implement managing command completion notification pacing in a memory sub-system, in accordance with some embodiments of the present disclosure.

FIG. 2 is a flow diagram illustrating an example of a method 200 to implement managing command completion notification pacing in a memory sub-system, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the notification management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic receives a memory access command at a memory sub-system controller (e.g., the memory sub-system controller 115 of FIG. 1). In some embodiments, the memory access command is a write command. In some embodiments, the memory access command is a read command. The processing logic can receive the memory access command from the host device (e.g., the host system 120 of FIG. 1). For example, the memory access command can receive the memory access command via an interface port coupled to the memory sub-system controller and the host device. Examples of interface ports include a serial advanced technology attachment (SATA) interface, a peripheral component interconnect express (PCIe) interface, universal serial bus (USB) interface, Fibre Channel, Serial Attached SCSI (SAS), etc. The host device can further utilize an NVM Express (NVMe) interface to access the memory sub-system controller when the memory sub-system is coupled with the host device by the PCIe interface. The interface port can provide an interface for passing control, address, data, and other signals between the memory sub-system and the host device. The memory sub-system can include multiple interface ports. In some embodiments, the processing logic can retrieve the memory access command from an entry of a data structure, such as a table storing memory access commands from the host device in each entry (e.g., a submission queue). In some embodiments, the data structure can be a submission queue 123A to 123N as illustrated in FIG. 1.

At operation 220, the processing logic executes the memory access command received at operation 210. In some embodiments, the processing logic executes the memory access command using a firmware component and/or hardware component of a memory device (e.g., the memory device 130 of FIG. 1). In some embodiments, executing the memory access command can include identifying a logical block address of the memory access command. The logical block address can be identified using the logical address information included in, e.g., metadata associated with the memory access command. The processing logic (e.g., the hardware component) can convert the logical block address into one or more translation units (TU). The processing logic can identify a pointer of each TU of the one or more TUs, where each pointer points to a location in the memory device of the data identified by each TU. The processing logic can execute the memory access command by executing each TU of the one or more TUs using the pointer of each TU. For example, the processing logic can write the data identified by a particular TU to the location in the memory device identified by the pointer of the particular TU.

At operation 230, the processing logic identifies one or more characteristics associated with the memory access command. In some embodiments, the characteristic can include a command type of the memory access command. For example, the command type can be a write command or a read command. The processing logic can identify the command type of the memory access command based on metadata of the memory access command. In some embodiments, the characteristic can include one or more quality of service (QoS) parameters that are associated with the memory access command. For example, the one or more QoS parameters can include bandwidth, latency, etc. In some embodiments, each memory access command can be grouped (e.g., by the host device) into one or more physical or virtual functions, where each memory access command in a particular physical/virtual function has the same corresponding set of QoS parameters. In some embodiments, the processing logic can identify the one or more QoS parameters that are associated with the memory access command based on metadata of the memory access command. For example, the metadata can specify a physical/virtual function to which the memory access command is grouped. The processing logic can read one or more registers storing each memory access command for the specified physical/virtual function and/or metadata associated with the one or more registers in order to identify the one or more QoS parameters that correspond to the specified physical/virtual function and are associated with the memory access command.

At operation 240, the processing logic identifies a threshold period of time that corresponds to the characteristic of the memory access command identified at operation 230. In some embodiments, each characteristic of the memory access command has a corresponding threshold period of time. For example, the processing logic can identify the command type of the memory access command, where the command type is a write command. In response to identifying that the command type is a write command, the processing logic can identify the corresponding threshold period of time for a write command. For example, the corresponding threshold period of time can be one or more milliseconds, seconds, hours, etc. The corresponding period of time can be preconfigured, e.g., by the host system, in order to meet memory device requirements (e.g., QoS requirements).

In some embodiments, the processing logic can identify the command type of the memory access command, where the command type is a read command. In response to identifying that the command type is a read command, the processing logic can identify the corresponding threshold period of time for a read command. The corresponding threshold period of time for a read command can be one or more milliseconds, seconds, hours, etc. In some embodiments, the corresponding threshold period of time for a read command can be a different period of time than the corresponding threshold period of time for a write command. In some embodiments, the corresponding threshold period of time for a read command can be equivalent to the corresponding threshold period of time for a write command. The corresponding period of time can be preconfigured, e.g., by the host system, in order to meet memory device requirements (e.g., QoS requirements).

In some embodiments, the processing logic can identify the one or more QoS parameters associated with the memory access command at operation 230. In response to identifying the one or more QoS parameters associated with the memory access command, the processing logic can identify the corresponding threshold period of time for the one or more QoS parameters. For example, the corresponding threshold period of time can be one or more milliseconds, seconds, hours, etc. The corresponding period of time can be preconfigured, e.g., by the host system, in order to meet memory device requirements (e.g., QoS requirements). In some embodiments, the corresponding threshold period of time for the one or more QoS parameters can be a different period of time than the corresponding threshold period of time for a write command and/or the corresponding threshold period of time for a read command. In some embodiments, the corresponding threshold period of time for the one or more QoS parameters can be equivalent to the corresponding threshold period of time for a write command and/or the corresponding threshold period of time for a read command.

At operation 250, the processing logic determines that a period of time associated with the memory access command satisfies the threshold period of time identified at operation 240. In some embodiments, the processing logic can identify (e.g., measure) a period of time between sending the most recent notification of completion of execution of a previous (e.g., most recently executed) memory access command and the completion of execution of the memory access command at operation 220. In response to identifying the period of time, the processing logic can determine whether the period of time satisfies the threshold period of time identified at operation 240. In some embodiments, satisfying the threshold period of time can include comparing the period of time to the threshold period of time and determining that the period of time is greater than or equal to the threshold period of time. In some embodiments, the period of time does not satisfy the threshold period of time if the period of time is less than the threshold period of time. In response to determining that the threshold period of time is not satisfied, the processing logic can store the memory access command in an entry of a memory buffer (e.g., a data structure such a table), where the memory buffer stores one or more executed memory access commands. In some embodiments, the processing logic stores the memory access command in a last entry of the memory buffer. The processing logic can then process another executed memory access command stored in a first entry of the memory buffer by performing operations 230 to 260 as described herein.

At operation 260, the processing logic notifies the host device of completion of execution of the memory access command at operation 220. In some embodiments, the processing logic notifies the host device in response to determining at operation 250 that the identified period of time associated with the memory access command satisfies the threshold period of time. In some embodiments, notifying the host device of the completion of the execution of the memory access command can include updating an entry of a data structure, such as a completion queue 121A to 121N as illustrated in FIG. 1, with a notification of the completion of the execution. In some embodiments, updating the entry of the data structure can include updating the entry with an identifier of the memory access command (e.g., the logical address information of the memory access command). In some embodiments, the processing logic can send an interrupt message to the host device. Sending the interrupt message to the host device can be performed in response to updating the entry of the data structure. In some embodiments, the interrupt message can include data indicating that the entry of the data structure has been updated. In some embodiments, the interrupt message is an electrical signal that interrupts the host device. In some embodiments, the interrupt message can be sent using an interrupt routine.

Figure 3:
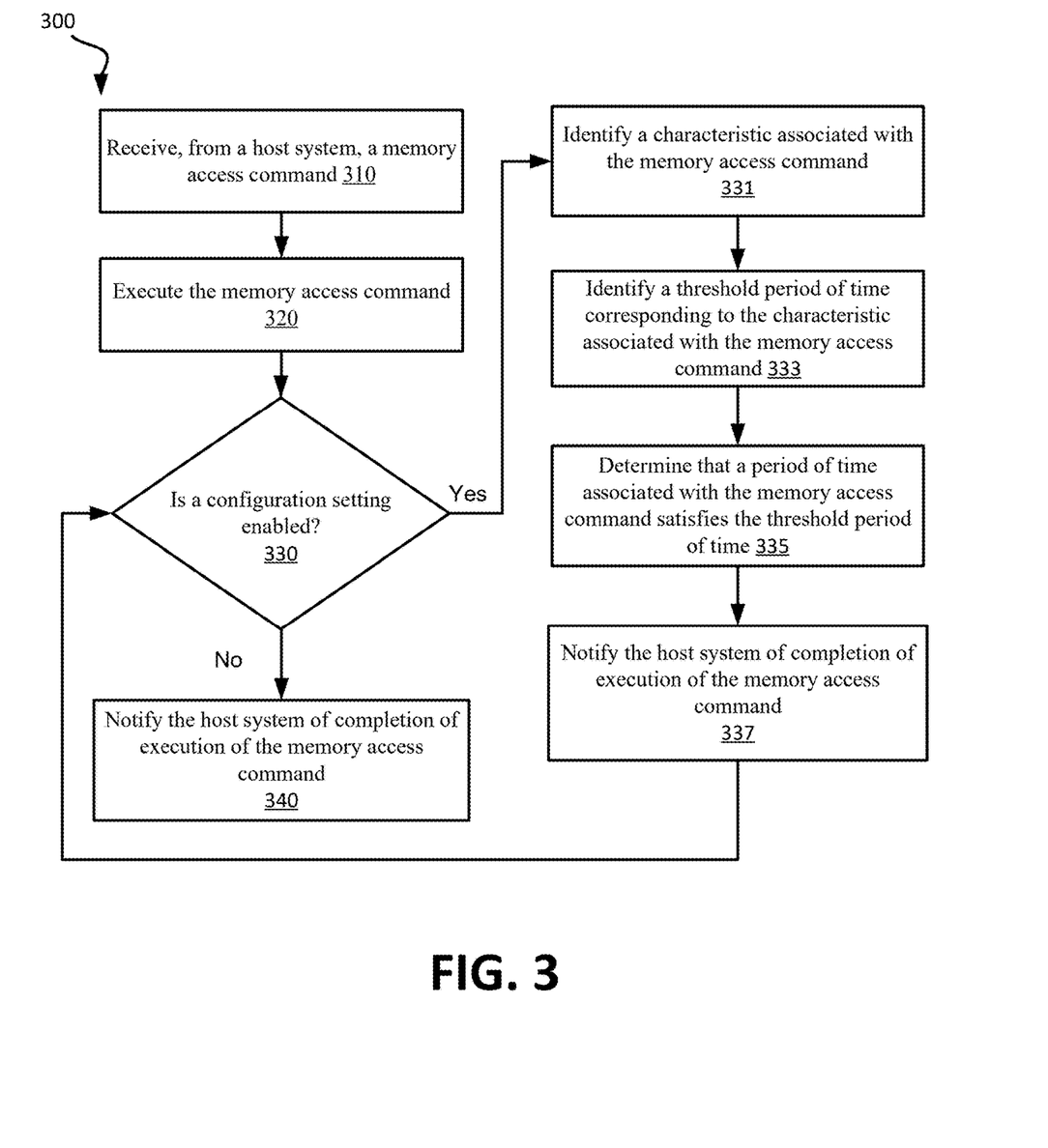
FIG. 3 is a flow diagram illustrating an example of a method to implement managing command completion notification pacing in a memory sub-system, in accordance with some embodiments of the present disclosure.

FIG. 3 is a flow diagram of an example method 300 to implement command completion notification pacing in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the notification management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives a memory access command at a memory sub-system controller (e.g., the memory sub-system controller 115 of FIG. 1). In some embodiments, the memory access command is a write command. In some embodiments, the memory access command is a read command. The processing logic can receive the memory access command from the host device (e.g., the host system 120 of FIG. 1). For example, the memory access command can receive the memory access command via an interface port coupled to the memory sub-system controller and the host device. Examples of interface ports include a serial advanced technology attachment (SATA) interface, a peripheral component interconnect express (PCIe) interface, universal serial bus (USB) interface, Fibre Channel, Serial Attached SCSI (SAS), etc. The host device can further utilize an NVM Express (NVMe) interface to access the memory sub-system controller when the memory sub-system is coupled with the host device by the PCIe interface. The interface port can provide an interface for passing control, address, data, and other signals between the memory sub-system and the host device. The memory sub-system can include multiple interface ports. In some embodiments, the processing logic can retrieve the memory access command from an entry of a data structure, such as a table storing memory access commands from the host device in each entry (e.g., a submission queue). In some embodiments, the data structure can be a submission queue 123A to 123N, as illustrated in FIG. 1.

At operation 320, the processing logic executes the memory access command received at operation 310. In some embodiments, the processing logic executes the memory access command using a firmware component and/or hardware component of a memory device (e.g., the memory device 130 of FIG. 1). In some embodiments, executing the memory access command can include identifying a logical block address of the memory access command. The logical block address can be identified using the logical address information included in, e.g., metadata associated with the memory access command. The processing logic (e.g., the hardware component) can convert the logical block address into one or more translation units (TU). The processing logic can identify a pointer of each TU of the one or more TUs, where each pointer points to a location in the memory device of the data identified by each TU. The processing logic can execute the memory access command by executing each TU of the one or more TUs using the pointer of each TU. For example, the processing logic can write the data identified by a particular TU to the location in the memory device identified by the pointer of the particular TU.

At operation 330, the processing logic determines whether a configuration setting is enabled. The configuration setting can indicate a configuration for notifying the host device of completion of executions of memory access commands. In some embodiments, determining whether the configuration setting is enabled can include reading one or more registers associated with the host device, where the one or more registers store data specifying the configuration setting. In some embodiments, determining whether the configuration setting is enabled can include reading the metadata associated with the memory access command received from the host device. In some embodiments, the configuration setting is specified by the host device and stored in one or more registers associated with the host device and accessible to the memory sub-system. In some embodiments, the configuration setting is preconfigured at manufacturing based on device requirements/specifications and/or customer/business requirements.

At operation 340, in response to determining that the configuration setting is not enabled, the processing logic notifies the host device of completion of execution of the memory access command at operation 320. In some embodiments, notifying the host device of the completion of the execution of the memory access command can include updating an entry of a data structure coupled to and/or otherwise associated with the host device with a notification of the completion of the execution. In some embodiments, updating the entry of the data structure can include updating the entry with an identifier of the memory access command (e.g., the logical address information of the memory access command). In some embodiments, the processing logic can send an interrupt message to the host device. Sending the interrupt message to the host device can be performed in response to updating the entry of the data structure. In some embodiments, the interrupt message can include data indicating that the entry of the data structure has been updated. In some embodiments, the interrupt message is an electrical signal that interrupts the host device. In some embodiments, the interrupt message can be sent using an interrupt routine.

At operation 331, in response to determining that the configuration setting is enabled, the processing logic identifies one or more characteristics associated with the memory access command. In some embodiments, the characteristic can include a command type of the memory access command. For example, the command type can be a write command or a read command. The processing logic can identify the command type of the memory access command based on metadata of the memory access command. In some embodiments, the characteristic can include one or more quality of service (QoS) parameters that are associated with the memory access command. For example, the one or more QoS parameters can include bandwidth, latency, etc. In some embodiments, each memory access command can be grouped (e.g., by the host device) into one or more physical or virtual functions, where each memory access command in a particular physical/virtual function has the same corresponding set of QoS parameters. In some embodiments, the processing logic can identify the one or more QoS parameters that are associated with the memory access command based on metadata of the memory access command. For example, the metadata can specify a physical/virtual function to which the memory access command is grouped. The processing logic can read one or more registers storing each memory access command for the specified physical/virtual function and/or metadata associated with the one or more registers in order to identify the one or more QoS parameters that correspond to the specified physical/virtual function and are associated with the memory access command.

At operation 333, the processing logic identifies a threshold period of time that corresponds to the characteristic of the memory access command identified at operation 331. In some embodiments, each characteristic of the memory access command has a corresponding threshold period of time. For example, the processing logic can identify the command type of the memory access command, where the command type is a write command. In response to identifying that the command type is a write command, the processing logic can identify the corresponding threshold period of time for a write command. For example, the corresponding threshold period of time can be one or more milliseconds, seconds, hours, etc. The corresponding period of time can be preconfigured, e.g., by the host system, in order to meet memory device requirements (e.g., QoS requirements).

In some embodiments, the processing logic can identify the command type of the memory access command, where the command type is a read command. In response to identifying that the command type is a read command, the processing logic can identify the corresponding threshold period of time for a read command. The corresponding threshold period of time for a read command can be one or more milliseconds, seconds, hours, etc. In some embodiments, the corresponding threshold period of time for a read command can be a different period of time than the corresponding threshold period of time for a write command. In some embodiments, the corresponding threshold period of time for a read command can be equivalent to the corresponding threshold period of time for a write command. The corresponding period of time can be preconfigured, e.g., by the host system, in order to meet memory device requirements (e.g., QoS requirements).

In some embodiments, the processing logic can identify the one or more QoS parameters associated with the memory access command at operation 331. In response to identifying the one or more QoS parameters associated with the memory access command, the processing logic can identify the corresponding threshold period of time for the one or more QoS parameters. For example, the corresponding threshold period of time can be one or more milliseconds, seconds, hours, etc. The corresponding period of time can be preconfigured, e.g., by the host system, in order to meet memory device requirements (e.g., QoS requirements). In some embodiments, the corresponding threshold period of time for the one or more QoS parameters can be a different period of time than the corresponding threshold period of time for a write command and/or the corresponding threshold period of time for a read command. In some embodiments, the corresponding threshold period of time for the one or more QoS parameters can be equivalent to the corresponding threshold period of time for a write command and/or the corresponding threshold period of time for a read command.

At operation 335, the processing logic determines that a period of time associated with the memory access command satisfies the threshold period of time identified at operation 333. In some embodiments, the processing logic can identify (e.g., measure) a period of time between sending the most recent notification of completion of execution of a previous (e.g., most recently executed) memory access command and the completion of execution of the memory access command at operation 320. In response to identifying the period of time, the processing logic can determine whether the period of time satisfies the threshold period of time identified at operation 333. In some embodiments, satisfying the threshold period of time can include comparing the period of time to the threshold period of time and determining that the period of time is greater than or equal to the threshold period of time. In some embodiments, the period of time does not satisfy the threshold period of time if the period of time is less than the threshold period of time. In response to determining that the threshold period of time is not satisfied, the processing logic can store the memory access command in an entry of a memory buffer (e.g., a data structure such a table), where the memory buffer stores one or more executed memory access commands. In some embodiments, the processing logic stores the memory access command in a last entry of the memory buffer. The processing logic can then process another executed memory access command stored in a first entry of the memory buffer by performing operations 330 to 337 as described herein.

At operation 337, the processing logic notifies the host device of completion of execution of the memory access command at operation 320. In some embodiments, the processing logic notifies the host device in response to determining at operation 335 that the identified period of time associated with the memory access command satisfies the threshold period of time. In some embodiments, notifying the host device of the completion of the execution of the memory access command can include updating an entry of a data structure, such as a completion queue 121A to 121N as illustrated in FIG. 1, with a notification of the completion of the execution. In some embodiments, updating the entry of the data structure can include updating the entry with an identifier of the memory access command (e.g., the logical address information of the memory access command). In some embodiments, the processing logic can send an interrupt message to the host device. Sending the interrupt message to the host device can be performed in response to updating the entry of the data structure. In some embodiments, the interrupt message can include data indicating that the entry of the data structure has been updated. In some embodiments, the interrupt message is an electrical signal that interrupts the host device. In some embodiments, the interrupt message can be sent using an interrupt routine.

Figure 4:
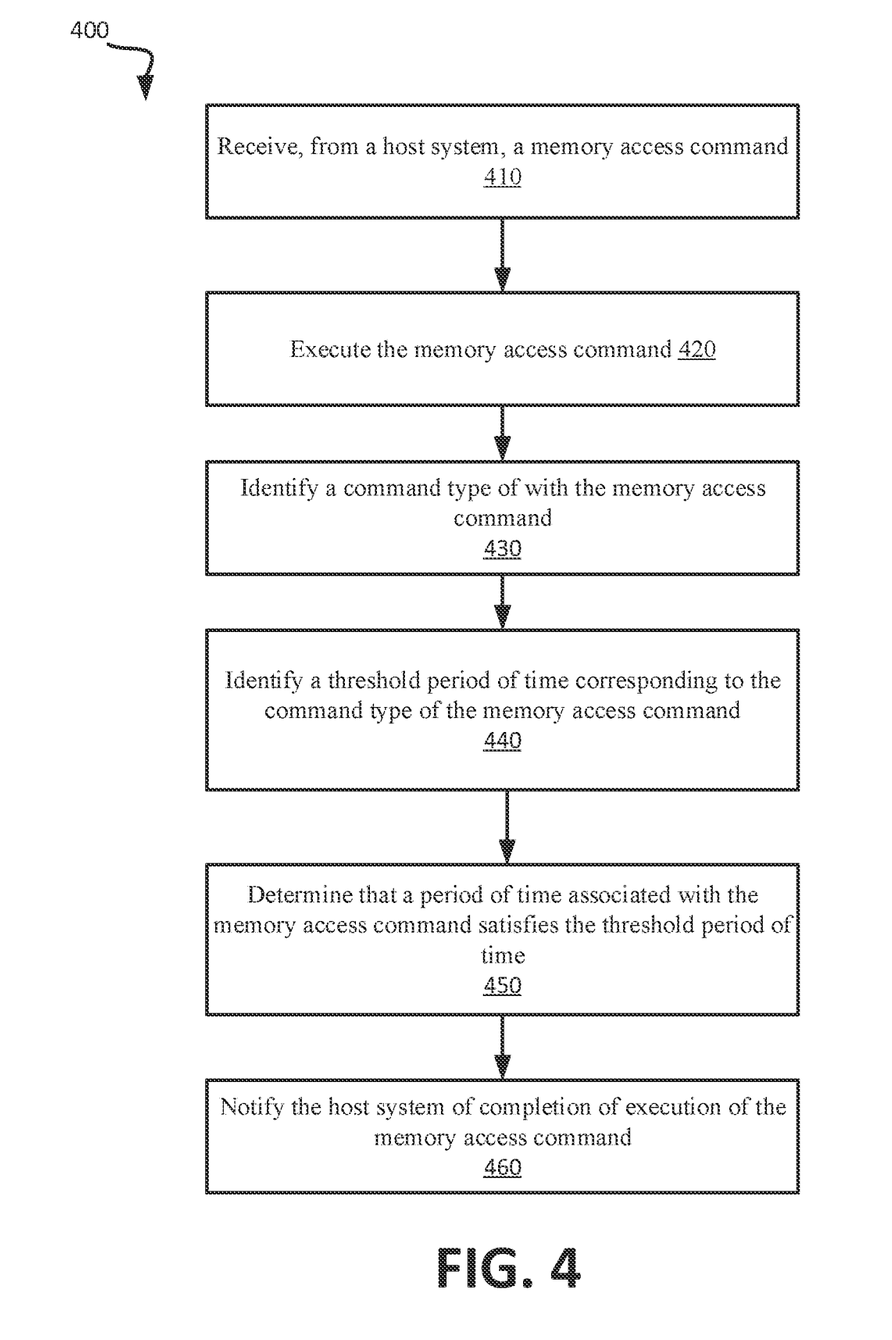
FIG. 4 is a flow diagram illustrating an example of a method to implement managing command completion notification pacing in a memory sub-system, in accordance with some embodiments of the present disclosure.

FIG. 4 is a flow diagram illustrating an example of a method 400 to implement managing command completion notification pacing in a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the notification management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a memory access command at a memory sub-system controller (e.g., the memory sub-system controller 115 of FIG. 1). In some embodiments, the memory access command is a write command. In some embodiments, the memory access command is a read command. The processing logic can receive the memory access command from the host device (e.g., the host system 120 of FIG. 1). For example, the memory access command can receive the memory access command via an interface port coupled to the memory sub-system controller and the host device. Examples of interface ports include a serial advanced technology attachment (SATA) interface, a peripheral component interconnect express (PCIe) interface, universal serial bus (USB) interface, Fibre Channel, Serial Attached SCSI (SAS), etc. The host device can further utilize an NVM Express (NVMe) interface to access the memory sub-system controller when the memory sub-system is coupled with the host device by the PCIe interface. The interface port can provide an interface for passing control, address, data, and other signals between the memory sub-system and the host device. The memory sub-system can include multiple interface ports. In some embodiments, the processing logic can retrieve the memory access command from an entry of a data structure, such as a table storing memory access commands from the host device in each entry (e.g., a submission queue). In some embodiments, the data structure can be a submission queue 123A to 123N, as illustrated in FIG. 1.

At operation 420, the processing logic executes the memory access command received at operation 410. In some embodiments, the processing logic executes the memory access command using a firmware component and/or hardware component of a memory device (e.g., the memory device 130 of FIG. 1). In some embodiments, executing the memory access command can include identifying a logical block address of the memory access command. The logical block address can be identified using the logical address information included in, e.g., metadata associated with the memory access command. The processing logic (e.g., the hardware component) can convert the logical block address into one or more translation units (TU). The processing logic can identify a pointer of each TU of the one or more TUs, where each pointer points to a location in the memory device of the data identified by each TU. The processing logic can execute the memory access command by executing each TU of the one or more TUs using the pointer of each TU. For example, the processing logic can write the data identified by a particular TU to the location in the memory device identified by the pointer of the particular TU.

At operation 430, the processing logic identifies a command type of the memory access command. For example, the command type can be a write command or a read command. The processing logic can identify the command type of the memory access command based on metadata of the memory access command.

At operation 440, the processing logic identifies a threshold period of time that corresponds to the command type of the memory access command identified at operation 430. In some embodiments, each characteristic of the memory access command has a corresponding threshold period of time. For example, the processing logic can identify the command type of the memory access command, where the command type is a write command. In response to identifying that the command type is a write command, the processing logic can identify the corresponding threshold period of time for a write command. For example, the corresponding threshold period of time can be one or more milliseconds, seconds, hours, etc. The corresponding period of time can be preconfigured, e.g., by the host system, in order to meet memory device requirements (e.g., QoS requirements).

In some embodiments, the processing logic can identify the command type of the memory access command, where the command type is a read command. In response to identifying that the command type is a read command, the processing logic can identify the corresponding threshold period of time for a read command. The corresponding threshold period of time for a read command can be one or more milliseconds, seconds, hours, etc. In some embodiments, the corresponding threshold period of time for a read command can be a different period of time than the corresponding threshold period of time for a write command. In some embodiments, the corresponding threshold period of time for a read command can be equivalent to the corresponding threshold period of time for a write command. The corresponding period of time can be preconfigured, e.g., by the host system, in order to meet memory device requirements (e.g., QoS requirements).

At operation 450, the processing logic determines that a period of time associated with the memory access command satisfies the threshold period of time identified at operation 440. In some embodiments, the processing logic can identify (e.g., measure) a period of time between sending the most recent notification of completion of execution of a previous (e.g., most recently executed) memory access command and the completion of execution of the memory access command at operation 420. In response to identifying the period of time, the processing logic can determine whether the period of time satisfies the threshold period of time identified at operation 440. In some embodiments, satisfying the threshold period of time can include comparing the period of time to the threshold period of time and determining that the period of time is greater than or equal to the threshold period of time. In some embodiments, the period of time does not satisfy the threshold period of time if the period of time is less than the threshold period of time. In response to determining that the threshold period of time is not satisfied, the processing logic can store the memory access command in an entry of a memory buffer (e.g., a data structure such as a table), where the memory buffer stores one or more executed memory access commands. In some embodiments, the processing logic stores the memory access command in a last entry of the memory buffer. The processing logic can then process another executed memory access command stored in a first entry of the memory buffer by performing operations 430 to 460 as described herein.

At operation 460, the processing logic notifies the host device of completion of execution of the memory access command at operation 420. In some embodiments, the processing logic notifies the host device in response to determining at operation 450 that the identified period of time associated with the memory access command satisfies the threshold period of time. In some embodiments, notifying the host device of the completion of the execution of the memory access command can include updating an entry of a data structure, such as a completion queue 121A to 121N as illustrated in FIG. 1, with a notification of the completion of the execution. In some embodiments, updating the entry of the data structure can include updating the entry with an identifier of the memory access command (e.g., the logical address information of the memory access command). In some embodiments, the processing logic can send an interrupt message to the host device. Sending the interrupt message to the host device can be performed in response to updating the entry of the data structure. In some embodiments, the interrupt message can include data indicating that the entry of the data structure has been updated. In some embodiments, the interrupt message is an electrical signal that interrupts the host device. In some embodiments, the interrupt message can be sent using an interrupt routine.

Figure 5:
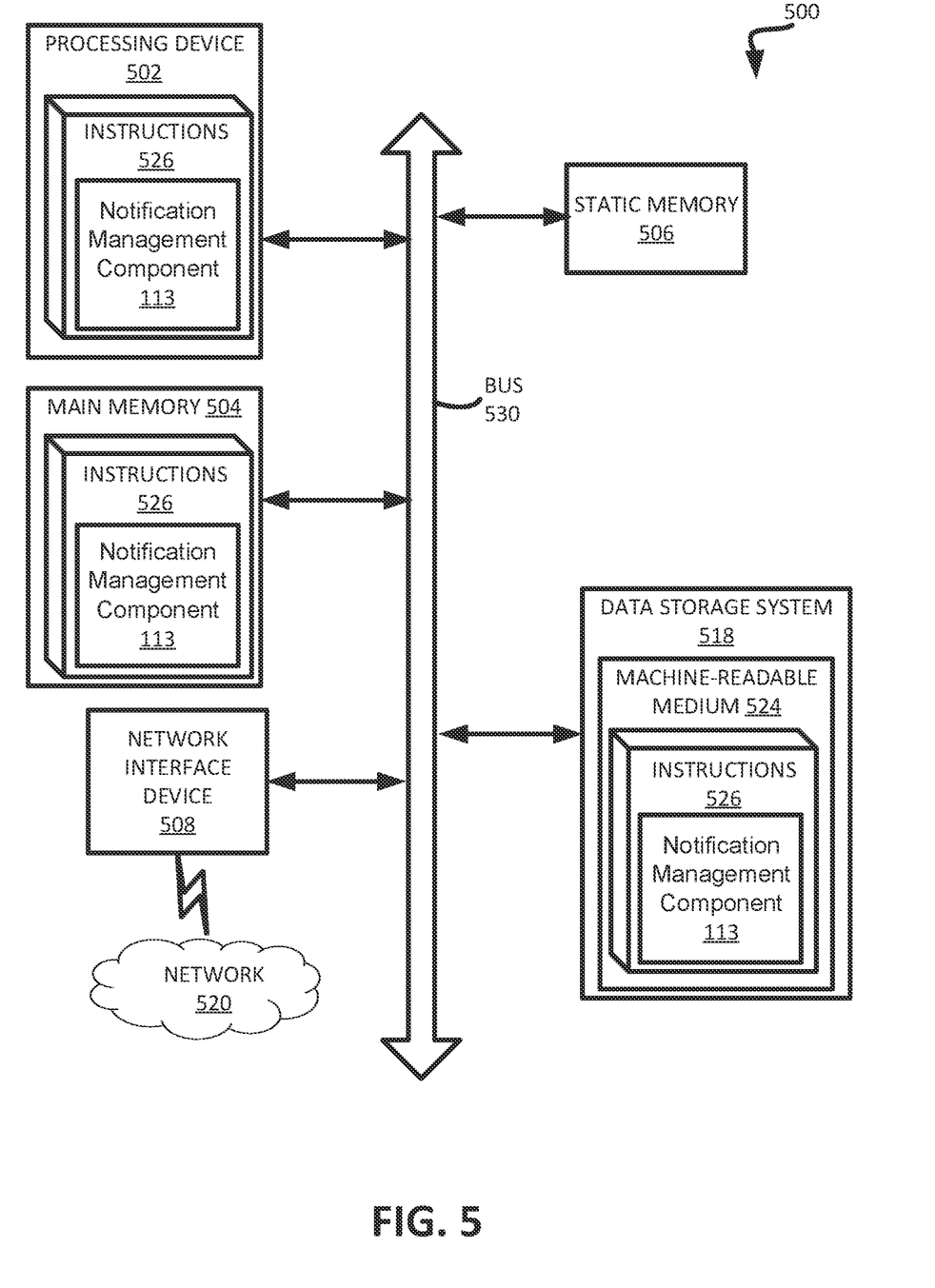
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the notification management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a component (e.g., notification management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
   receiving, from a host system, a memory access command;
   executing the memory access command;
   identifying a characteristic associated with the memory access command;
   identifying a threshold period of time corresponding to the characteristic associated with the memory access command;
   determining that a period of time associated with a command completion notification of a plurality of memory access commands comprising the memory access command satisfies the threshold period of time, wherein the period of time associated with the command completion notification is a duration between notifying the host system of a completion of execution of a previous memory access command and completion of execution of the memory access command; and
   responsive to determining that the period of time associated with the command completion notification of the plurality of memory access commands satisfies the threshold period of time, notifying the host system of completion of execution of the memory access command.

2. The system of claim 1, further comprising:
   determining that a configuration setting is enabled, wherein the configuration setting indicates a configuration for notifying the host system of the completion of execution of the memory access command, and wherein the configuration setting is specified by the host system.

3. The system of claim 2, wherein identifying the characteristic associated with the memory access command is in response to determining that the configuration setting is enabled.

4. The system of claim 1, wherein the characteristic associated with the memory access command comprises a command type or function type of the memory access command.

5. The system of claim 1, wherein the characteristic associated with the memory access command comprises one or more quality of service parameters of the memory access command.

6. The system of claim 1, wherein to notify the host system of the completion of the execution of the memory access command, the processing device is to perform operations further comprising:
   updating an entry of a data structure associated with the host system with a notification of the completion of the execution of the memory access command; and sending an interrupt message to the host system, wherein the interrupt message indicates the updated entry of the data structure.

7. A method comprising:
receiving, from a host system, a memory access command;
executing the memory access command;
identifying a command type of the memory access command;
identifying a threshold period of time corresponding to the command type of the memory access command;
determining that a period of time associated with a command completion notification of a plurality of memory access commands comprising the memory access command satisfies the threshold period of time, wherein the period of time associated with the command completion notification is a duration between notifying the host system of a completion of execution of a previous memory access command and completion of execution of the memory access command; and
responsive to determining that the period of time associated with the command completion notification of the plurality of memory access commands satisfies the threshold period of time, notifying the host system of completion of execution of the memory access command.

8. The method of claim 7, further comprising:
determining that a configuration setting is enabled, wherein the configuration setting indicates a configuration for notifying the host system of the completion of execution of the memory access command, and wherein the configuration setting is specified by the host system.

9. The method of claim 8, wherein identifying the command type of the memory access command is in response to determining that the configuration setting is enabled.

10. The method of claim 7, wherein notifying the host system of the completion of the execution of the memory access command comprises:
updating an entry of a data structure associated with the host system with a notification of the completion of the execution of the memory access command; and
sending an interrupt message to the host system, wherein the interrupt message indicates the updated entry of the data structure.

11. The method of claim 7, further comprising:
identifying one or more quality of service parameters of the memory access command;
identifying another threshold period of time corresponding to the one or more quality of service parameters of the memory access command;
determining that the period of time associated with the command completion notification of the plurality of memory access commands comprising the memory access command satisfies the another threshold period of time; and
responsive to determining that the period of time associated with the memory access command satisfies the another threshold period of time, notifying the host system of completion of execution of the memory access command.

12. A non-transitory computer-readable storage medium comprising instructions that, when executed by a processing device, cause the processing device to perform operations comprising:
receiving, from a host system, a memory access command;
executing the memory access command;
identifying a characteristic associated with the memory access command;
identifying a threshold period of time corresponding to the characteristic associated with the memory access command;
determining that a period of time associated a command completion notification of a plurality of memory access commands comprising with the memory access command satisfies the threshold period of time, wherein the period of time associated with the command completion notification is a duration between notifying the host system of a completion of execution of a previous memory access command and completion of execution of the memory access command; and
responsive to determining that the period of time associated with the command completion notification of the plurality of memory access commands satisfies the threshold period of time, notifying the host system of completion of execution of the memory access command.

13. The non-transitory computer-readable storage medium of claim 12, wherein the processing device is to perform operations further comprising:
determining that a configuration setting is enabled, wherein the configuration setting indicates a configuration for notifying the host system of the completion of execution of the memory access command, and wherein the configuration setting is specified by the host system.

14. The non-transitory computer-readable storage medium of claim 13, wherein identifying the characteristic associated with the memory access command is in response to determining that the configuration setting is enabled.

15. The non-transitory computer-readable storage medium of claim 12, wherein the characteristic associated with the memory access command comprises a command type or function type of the memory access command.

16. The non-transitory computer-readable storage medium of claim 12, wherein the characteristic associated with the memory access command comprises one or more quality of service parameters of the memory access command.

17. The non-transitory computer-readable storage medium of claim 12, wherein to notify the host system of the completion of the execution of the memory access command, the processing device is to perform operations further comprising:
updating an entry of a data structure associated with the host system with a notification of the completion of the execution of the memory access command; and
sending an interrupt message to the host system, wherein the interrupt message indicates the updated entry of the data structure.

* * * * *